Aug. 25, 1964

E. CIRCENIS 3,145,950

WING LIFT INCREASING DEVICE

Filed Jan. 22, 1962

INVENTOR.
EDVINS CIRCENIS
BY
Reynolds & Christensen
ATTORNEYS

Aug. 25, 1964  E. CIRCENIS  3,145,950
WING LIFT INCREASING DEVICE
Filed Jan. 22, 1962  3 Sheets-Sheet 2
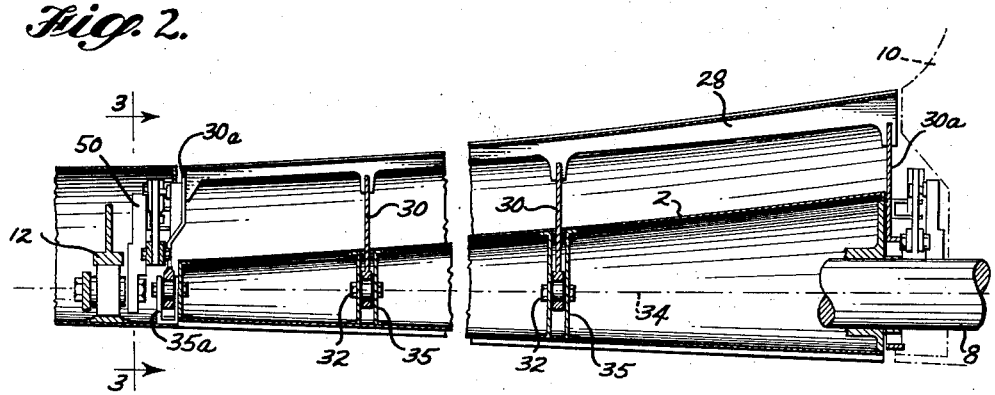
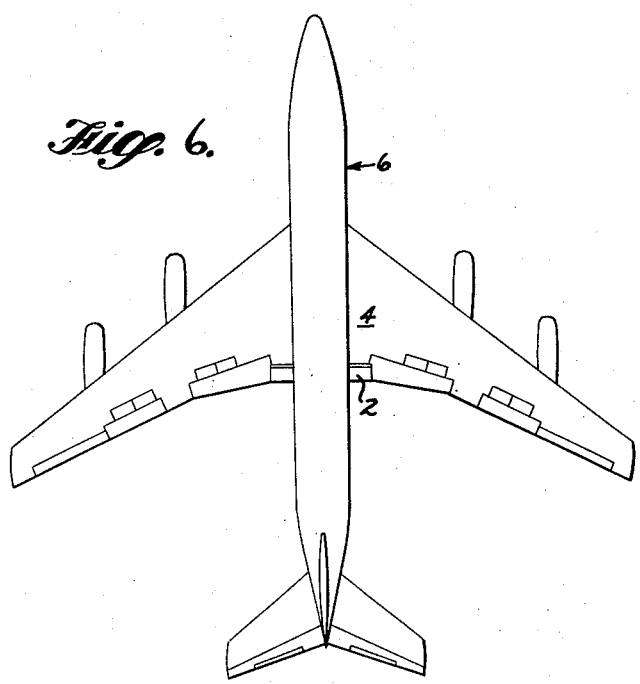
INVENTOR.
*EDVINS CIRCENIS*
BY *Reynolds & Christensen*
*ATTORNEYS*

Aug. 25, 1964  E. CIRCENIS  3,145,950
WING LIFT INCREASING DEVICE
Filed Jan. 22, 1962  3 Sheets-Sheet 3

INVENTOR.
EDVINS CIRCENIS
BY
Reynolds + Christensen
ATTORNEYS

United States Patent Office 3,145,950
Patented Aug. 25, 1964

3,145,950
WING LIFT INCREASING DEVICE
Edvins Circenis, Seattle, Wash., assignor to The Boeing Company, Seattle, Wash., a corporation of Delaware
Filed Jan. 22, 1962, Ser. No. 167,696
3 Claims. (Cl. 244—42)

The present invention relates to aircraft and more particularly to wing lift increasing devices for such craft.

One widely used form of wing lift increasing device is the so-called slotted flap arrangement wherein the wing flap is so positioned relative to the fixed wing that a slot is formed therebetween for directing flow of air from the lower surface of the airfoil through the structure for subsequent discharge at the upper surface of the airfoil in the direction of and substantially parallel to the airstream at the upper surface of the flap. Various devices have been previously employed in connection with slotted flap arrangements for controlling the flow of air through the slot under different conditions of operations. For example, one such device involving a slot control vane is disclosed in Patent 2,334,975 to W. W. Williams. The actuating mechanism for these earlier controlled slot arrangements required considerable space and often required more space than was available, particularly in the case of a fillet flap as found on modern day aircraft. It is a principal object of the present invention therefore to provide a new slotted flap arrangement, including novel actuating mechanism, which is adaptable to all wing areas including those where it otherwise would be impossible or impractical to use conventional flap arrangements due to lack of space for the flap actuating mechanism.

A further object of the invention is to provide a slotted flap arrangement which can be used in wing areas where it is impossible or impractical to utilize flap tracks and flap carriages as a part of the flap actuating mechanism.

An additional object of the invention is to provide a slotted flap arrangement particularly adapted for use in conjunction with a fillet flap.

Still another object of the invention is to provide a single slotted flap arrangement wherein, upon flap deflection, the slot is opened to a predetermined extent as the flap moves to a partially deflected high lift low drag position and the extent of the opening is maintained constant thereafter as the flap moves to its fully deflected high lift high drag position.

A still further object of the invention is to provide a single slotted flap arrangement wherein opening of the slot is initiated immediately upon downward deflection of the flap.

The invention also intends to provide a slotted flap arrangement which is simple in construction and lighter in weight, as well as more compact than those previously known.

Other objects of the invention include providing a slotted flap arrangement wherein the slot control means acts as a part of the upper wing surface and serves as a means for giving the upper wing surface a more desirable curvature as the flap approaches and assumes its fully deflected position.

These objects are reached according to the invention through the provision of a simple hinge mechanism for the slot control means by which a slot control vane within this means can assume such a slot closure position across the upper opening of the slot as to constitute a smooth-line continuum of the upper surface portion of the wing-flap airfoil in undeflected relationship; the hinge mechanism preferably being operative to maintain the control vane stationary in this position relative to the fixed wing portion of the airfoil as the flap is adjusted to a partially deflected high lift low drag position to open the slot, and thereafter as the flap is adjusted to a fully deflected high lift high drag position, to pivot the control vane in concert with the flap to maintain the slot opening at the dimension acquired in the partially deflected position of the flap.

In preferred form, the hinge mechanism includes a cam track and cam follower arrangement requiring relatively very little space. The slot control vane in this form is pivotally mounted about the hinge axis of the flap member. The cam follower forms a part of articulated link means pivotally interconnecting the flap and the slot control vane, and through its sliding engagement with the cam track actuates the control vane to respond in the foregoing manner as the flap is adjusted to its respective positions, which pattern of response is dictated by the shape of the cam track.

This preferred form is used to illustrate the invention, without limiting it thereto, in the accompanying drawings wherein:

FIGURE 2 is a partial section of the slotted flap arrangement taken along the hinge axis of the flap and looking toward the leading edge of the wing;

Figure 1:
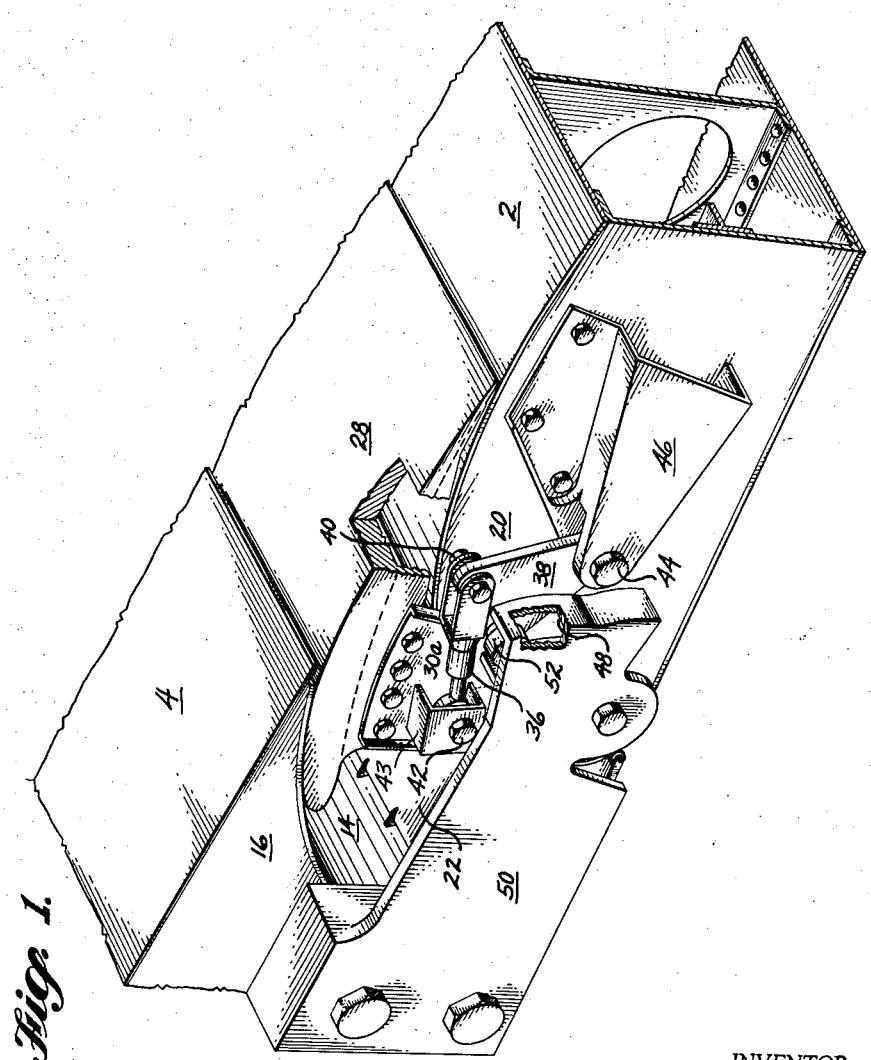
FIGURE 1 shows one end portion of the preferred slotted flap arrangement in perspective.
Figure 3:
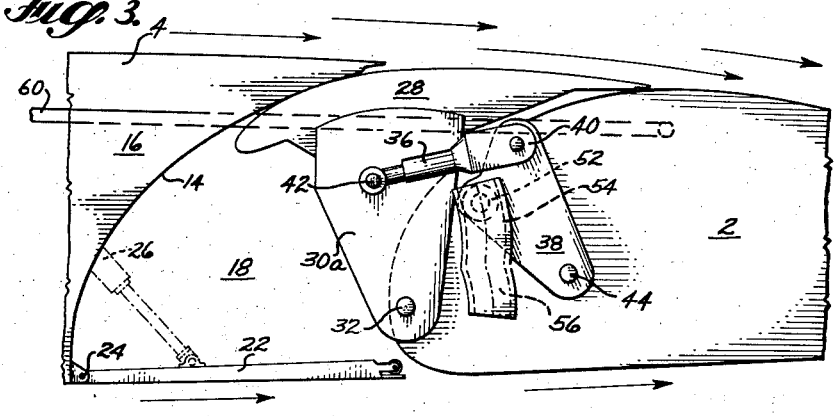
Figure 4:
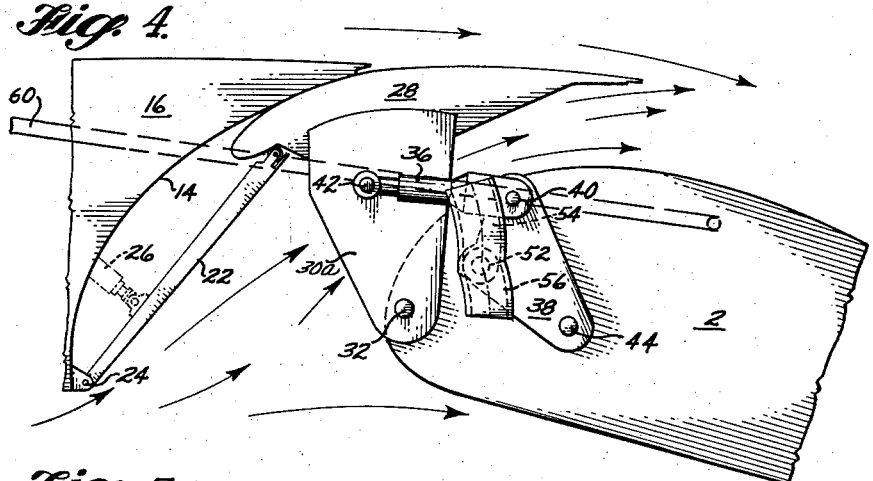
Figure 5:
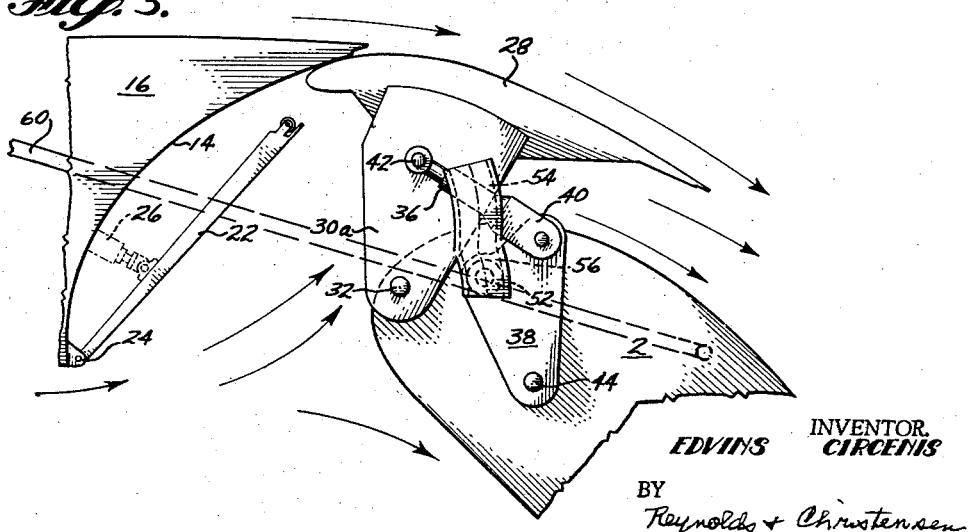

FIGURES 3–5 are end elevational views of the slotted flap arrangement as seen along line 3—3 of FIGURE 2, FIGURE 3 illustrating the positioning of the respective elements in the undeflected position of the flap, FIGURE 4 in the partially deflected high lift low drag position of the flap, and FIGURE 5 in the fully deflected high lift high drag position of the flap; and FIGURE 6 is a plan view of a conventional aircraft incorporating fillet flap structure to which the present invention is particularly applicable.

In FIGURE 6 the movable fillet flap 2 constitutes a relatively hinged part of the trailing edge portion of a fixed wing portion 4 of the aircraft 6. The present invention is particularly adaptable to such a fillet flap, but can or may be adapted to any relatively movable arrangement within the airfoil components of an aircraft and most advantageously to those areas where space limitations have prohibited or minimized the use of conventional arrangements.

In a single slotted fillet flap constructed according to the invention, the fillet flap 2 is pivotally mounted in trailing position behind the fixed wing section 4 on an inboard hinge pin 8 and supporting structure 10 shown in part in FIGURE 2 and an outboard hinge fitting 12, all of which lie within the overall contour of the wing. The flap 2 is arranged to clear the rear surface plate 14 of the truncated trailing edge portion 16 of the fixed wing section 4 in all positions of the flap so as to provide an airflow slot 18 between the rear surface plate and the nose portion 20 of the flap 2. A cove lip door for sealing the airflow slot at the lower surface of the wing-flap airfoil is provided at 22 in the form of a sheet metal plate hinged to the fixed wing section 4 at 24 and arranged to be controlled automatically by hydraulic actuator means 26. This cove lip door and its arrangement within the overall mechanism are conventional and form no part of the invention.

A slot control vane 28 of curved plate form is disposed at the upper opening of the slot 18 to seal the slot at the upper surface of the wing-flap airfoil. The vane is so shaped and arranged between the nose portion 20 of the flap and the truncated trailing edge portion 16 of the fixed wiring section 4 as to form a smooth line continuum of the upper surface portion of the wing-flap airfoil in undeflected relationship. As such, it lies substantially entirely within the upper end portion of the slot defined by the wing-flap airfoil in undeflected relationship (FIGURE 3). The slot control vane 28 is secured on a series of spaced vertical struts 30 which are pivotally mounted about pivot pins 32 that are disposed along the flap hinge axis 34 within the contour of the trailing edge portion of the wing section and carried in supporting structure 35, 35a of the flap and/or fixed wing portion. While the vane 28 is preferably mounted in this fashion on the flap, it is contemplated that it can or may be pivotally mounted about the flap hinge axis from hinge means borne entirely by the fixed wing portion of the airfoil, such as in the case of struts 30a at the inboard and outboard ends of the flap.

The vane 28 is also linked with the flap 2 at each of the inboard and outboard ends of the flap by a linkage comprising a bifurcated link 36 and a crank 38 which are articulated with respect to one another about a floating wrist pin 40 and pivotally connected with the respective strut 30a of the vane by a fixed pivot pin 42 carried in a bracket 43 thereon, and with the flap 2 at its respective inboard or outboard end by a fixed pivot pin 44 carried by a bracket 46 thereon. It is apparent that the linkage can cause the vane to be pivotally responsive to any deflection of the flap. The term "floating" is used in connection with the wrist pin 40 to describe its freely movable condition apart from the forces exerted on it by the link means 36 and 38.

Movement of the linkage itself is not unlimited, however, and is in fact regulated within definite limits by the further provision of cam means connecting the link means with the fixed wing portion 4 of the airfoil. The cam means, in this preferred form, includes a cam track 48 defined by each of the arms 50 extending rearwardly from the fixed wing portion and straddling the flap at its ends, and a cam follower 52 secured on the crank 38 and slidably engaged in the cam track 50. Alternatively, the cam track and cam follower can or may be reversed in their relative disposition within the mechanism, as will be apparent to those acquainted with such means. But in all events, the angular movement of the flap and slot control members—which had assumed a certain interdependency through the link means—is made to follow a pattern dictated by the shape and disposition of the cam track. This pattern can or may assume a number of variations as a function of flap deflection but it is preferred in accordance with the invention otherwise that the cam track have a shape and disposition operative to move the wrist pin 40 (and the link 36) through an angular path about the pivot pin 42 on the strut 30a as the flap is adjusted to its partially deflected position, which will thus maintain the vane 28 in stationary disposition relative to the fixed wing portion 4 as the slot 18 is opened to a predetermined extent, such as to achieve added lift for take-off and climb (FIGURE 4). With full deflection of the flap (FIGURE 5) the track configuration is such as to move the wrist pin 40 (and the crank 38) through an angular path about the flap hinge axis 34 which will pivot the vane 28 in concert with the flap about the axis to maintain the extent of the slot opening constant and direct the air which spills upward through the slot down along the flap surface to minimize drag and maximize lift. Essentially the illustrated form of cam track defines a pair of intersecting successive arcuate paths 54 and 56 for the follower 52, so oriented with respect to the various pivot points in the link means and with respect to one another as to effect this pattern upon flap adjustment from the flaps-up position of FIGURE 3 to the partial flaps-down position of FIGURE 4, and thereafter to the ultimate flaps-down position of FIGURE 5. By proper proportioning of the flap about its axis and so mounting it relative to the vane 28 as to allow for separation of the flap from the vane during such movement, the practical effect is firstly to open the slot immediately upon deflecting the flap downwardly to the partial flaps-down position and thereafter to maintain a constant slot opening as the flap proceeds to its fully directed position.

Lowering of the flap is accomplished by the push-pull control member 60 or other conventional means, while simultaneous opening of the cove lip door 22 is effected by the actuator 26 (FIGURES 3-5). The elements are raised by the above-described mechanism operating in reverse sequence.

It will be evident from FIGURE 5 that the vane 28 serves as a means for causing the upper surface of the fixed wing portion 4 to curve down toward the flap, to provide an almost faired upper surface on the airfoil in the flap position of that figure. This, of course, is extremely desirable.

Other advantages have been pointed up or will be apparent, as will other features of the invention. It will also be evident that considerable modifications and elaboration can be carried out with regard to the various features of the invention without departing from the scope and spirit thereof as defined in the following claims.

I claim as my invention:

1. In a slotted flap structure on a wing, a flap member constituting a part of the trailing edge of a fixed portion of the wing, said flap member being mounted for deflection in relation to the fixed wing portion about a fixed axis extending within the contour of its trailing edge, and being spaced from said fixed wing portion so as to define an airflow slot therebetween, means operative to effect such deflection of the flap member, a closure member for the slot which is pivotally mounted about a fixed axis extending within said contour of the trailing edge so as to lie substantially entirely within the upper end portion of the slot when the flap member is disposed in its undeflected position in relation to the fixed wing portion, a pair of links pivotally interconnecting the flap and slot closure members so as to cause the latter to be pivotally responsive to the deflection of the former, said links being articulated with respect to one another about a floating pivot, and cam means interconnecting one of the links with the fixed wing portion so that the response of the closure member is delayed temporarily until the flap member reaches a predetermined partial deflection.

2. A wing lift increasing device according to claim 1 wherein the flap and the slot closure members are pivotally mounted about a common hinge axis.

3. A wing lift increasing device according to claim 1 wherein the cam means includes a cam track mounted on the fixed wing portion and a cam follower mounted on said one link and slidably engaged in the cam track.

References Cited in the file of this patent

UNITED STATES PATENTS

| | | |
|---|---|---|
| 2,334,975 | Williams | Nov. 23, 1943 |
| 2,908,454 | De Wolff | Oct. 13, 1959 |
| 3,041,014 | Gerin | June 26, 1962 |